United States Patent Office 3,488,725
Patented Jan. 6, 1970

3,488,725
FIRE RETARDANT ACRYLIC POLYMERS
Allan Ellis Sherr, Martinsville, N.J., and Walter Moreland Thomas, Darien, Conn., assignors to American Cyanamid Company, Stamford, Conn., a corporation of Maine
No Drawing. Continuation-in-part of application Ser. No. 551,945, May 23, 1966. This application Aug. 2, 1968, Ser. No. 749,621
Int. Cl. C08f 45/56; C09k 3/28
U.S. Cl. 260—45.75
8 Claims

ABSTRACT OF THE DISCLOSURE

Compositions of matter comprising an acrylic polymer and at least two compounds having the formula $$SnX_4$$

wherein X is chlorine, bromine or iodine useful in the production of structural members such as wall paneling, are disclosed.

CROSS-REFERENCE TO RELATED APPLICATIONS

This application is a continuation-in-part of our copending application, Ser. No. 551,945, filed May 23, 1966 now abandoned.

BACKGROUND OF THE INVENTION

The incorporation of various materials into thermoplastic resins in order to improve the flame-retardance thereof has been known in the prior art. Many compounds are commercially available for such a use, among them being chlorostyrene copolymers, chlorinated paraffin wax in admixture with triphenyl stilbine, chlorinated paraffins and aliphatic antimonyl compounds, as well as antimony oxide-chlorinated hydrocarbon mixtures. A material drawback of these compounds, however, has been the fact that generally a large amount, i.e., upwards of 35%, of additive must be incorporated into the resin in order to make it sufficiently flame-retardant. Also these prior art additives tend to crystallize or oil out of the resin after a relatively short time of incorporation.

SUMMARY

We have now found a mixture of compound which may be added to acrylate and methacrylate polymers in relatively small amounts and still result in the production of satisfactory flame-retardant compositions and which will not crystallize or oil out of the resin after incorporation therein.

The production of acrylate and methacrylate composition which are flame-retardant, i.e., have high resistance to burning, is of considerable commercial importance. For example, such articles as castings, moldings or laminated structures and the like are required, or at least desired, to be resistant to fire and flame and to possess the ability to endure heat without deterioration. Typical illustrations of such applications include structural members such as wall coverings, wall paneling, windows and items such a skylights, shower stalls, room dividers and the like.

The exact mechanism by which the stannic halide mixture functions as a flame-retarding additive according to the instant invention is not completely understood. It is believed, however, while not wishing to be bound by any explanation or theory, that the stannic halides form a complex with the acrylate or methacrylate polymer to create a flame-retarded system.

In addition to the resultant flame-retardancy, we have also discovered that the use of a stannic halide mixture allows the addition of various materials which, without the stannic halide, are insoluble in the monomer mixture before casting. Therefore, materials such as inorganic salts which modify the electrical properties of the polymer can now be incorporated therein. Another surprising result in regard to the use of the stannic halide mixture is that the transparency or light transmission of the polymers is not inhibited after they have been added, a result which prohibits the use of many other known flame-retardants.

Furthermore, we have observed that the use of the stannic halide mixtures does not decrease the other desired properties of the polymers, such as hardness, and in some instances, these properties are actually also enhanced.

DESCRIPTION OF THE INVENTION INCLUDING PREFERRED EMBODIMENTS

The acrylate and methacrylate polymers into which the flame-retardant agents may be incorporated to produce the novel compositions of the present invention, are the acrylate and methacrylate polymers produced from monomers having the formula (I) 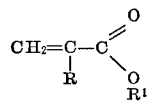

wherein R is hydrogen or methyl radical and $R^1$ is hydrogen or an alkyl radical having from 1 to 6 carbon atoms, inclusive. Examples of monomers represented by Formula I include acrylic acid, methyl acrylate, ethyl acrylate, n-propyl acrylate, isopropyl acrylate, n-butyl acrylate, t-butyl acrylate, isobutyl acrylate, n-amyl acrylate, t-amyl acrylate, hexyl acrylate and the corresponding methyl, ethyl, n-propyl, isopropyl, n-butyl, t-butyl, isobutyl, n-amyl, t-amyl and hexyl methacrylates.

The acrylate and methacrylate polymers may be utilized as homopolymers or copolymers thereof in amounts such that the final polymers contain at least 30%, by weight, based on the total weight of the polymer, of the acrylate, methacrylate or mixture thereof.

Examples of monomers which can be copolymerized with the monomers represented in Formula I, either singly or in a plurality (two, three, four or any desired number), the latter often being desirable in order to improve the compatibility and copolymerization characteristics of the mixture of monomers and to obtain copolymers having the particular properties desired for the particular service application, in amounts up to about 70%, by weight, based on the total weight of the polymer, are such monomers as the unsaturated alcohol esters, more particularly the allyl, methallyl, vinyl, etc., esters of saturated and unsaturated aliphatic and aromatic monobasic and polybasic acids such, for instance, as acetic, propionic, butyric malonic, succinic, maleic, fumaric, citraconic, itaconic, benzoic, phthalic, terephthalic, etc., acids; the saturated monohydric alcohol esters, e.g., the methyl, ethyl, propyl, isopropyl, butyl, sec.-butyl, amyl, etc., esters of ethylenically unsaturated aliphatic monobasic and polybasic acids, illustrative examples of which appear above; vinyl cyclic compounds (including monovinyl aromatic hydrocarbons, e.g., styrene, o-, m-, and p-chlorostyrenes, -bromostyrenes, -fluorostyrenes, -methylstyrenes, -ethylstyrenes, -cyanostyrenes, the various poly-substituted styrenes such, for example, as the various di-, tri-, and tetra-chlorostyrenes, -bromostyrenes, -fluorostyrenes, -methylstyrenes, -ethylstyrenes, -cyanostyrenes, etc., vinyl naphthalene, vinylcyclohexane, vinyl furane, vinyl pyridine, vinyl dibenzofuran, divinyl benzene, trivinyl benzene, allyl benzene, diallyl benzene, N-vinyl carbazole, the various allyl cyanostyrenes, the various alpha-substituted styrenes and alpha-substituted ring-substituted styrenes, e.g., alpha-methyl styrene, alpha-methyl-para-methyl styrene, etc.

Other examples of monomers that can be copolymerized with the monomers of Formula I are the vinyl halides, more particularly vinyl fluoride, vinyl chloride, vinyl bromide and vinyl iodide, and the various vinylidene compounds, including the vinylidene halides, e.g., vinylidene chloride, vinylidene bromide, vinylidene fluoride, vinylidene iodide and the like.

More specific examples of allyl compounds that can be copolymerized with the allyl compounds of Formula I are allyl alcohol, methallyl alcohol, diallyl carbonate, allyl lactate, allyl α-hydroxyisobutyrate, allyl trichlorosilane, diallyl diglycol carbonate, diallyl methylgluconate, diallyl tartronate, diallyl tartrate, diallyl mesaconate, the diallyl ester of muconic acid, diallyl chlorophthalate, diallyl dichlorosilane, the diallyl ester of endomethylene tetrahydrophthalic anhydride, triallyl tricarballylate, triallyl cyanurate, triallyl isocyanurate, triallyl citrate, triallyl phosphate, tetrallyl silane, tetrallyl silicate, hexallyl disiloxane, etc. Other examples of allyl compounds that may be employed are given, for example in U.S. Patent No. 2,510,503, issued June 6, 1950.

Among the comonomers which are preferred for use in carrying our invention into effect are, for example, compounds such as acrylonitrile, the various substituted acrylonitriles (e.g., methacrylonitrile, ethacrylonitrile, phenylacrylonitrile, etc.); acrylamide and the various N-substituted acrylamides and alkacrylamides, for instance, N-dialkyl acrylamides and methacrylamides, e.g., N-dimethyl, -diethyl, -dipropyl, -dibutyl, etc., acrylamides and methacrylamides. Also the glycol diacrylates, i.e. those compounds produced by esterifying acrylic or methacrylic acid with a polyglycol having 4–8 carbon atoms or a monoglycol having 2–4 carbon atoms. Examples of these glycols include diethylene glycol, triethylene glycol, tetraethylene glycol, dipropylene glycol, bis(4-hydroxybutyl)ether, polyethylene glycol, ethylene glycol, propylene glycol, the propanediols, 1,2 and 1,3; the butanediols, 1,2, 1,3 and 1,4 and the like.

Of course, it is also possible to utilize copolymers produced from two or more of the monomers represented by Formula I, above and still obtain the benefits heretofore set forth.

The above mentioned monomers may be polymerized, copolymerized, etc., in any known manner such as by free-radical generating catalysts, irradiation, anion and/or cation-type catalysts and the like, the specific method of polymerization, however, forming no part of the present invention.

The stannic halide mixture should be incorporated, singly or in admixture, into the polymers in flame-retarding amounts, e.g. at least about 8%, by weight, and preferably from about 10% to about 20%, by weight, of the mixture, based on the weight of the polymer.

The method of incorporating the stannic halide mixture into the polymers is not critical and any known method may be used. One method is to add the halide mixture during the polymer production, i.e. during the polymerization (casting etc.). The halide mixture may also be added to a solvent solution of the polymer, which solvent is then removed by evaporation, etc. Additionally, the halide mixture may be added to the polymer by (1) molding or extruding them simultaneously, (2) milling them on, for example, a two-roll mill, a Banbury mixer etc., or (3) by merely blending the halide mixture with the polymer in powder form.

It should be noted that it is also within the scope of the present invention to incorporate such ingredients as plasticizers, dyes, pigments, stabilizers, antioxidants, antistatic agents, photochromic materials and the like to our novel compositions.

The following examples are set forth for purposes of illustration only and are not to be construed as limitations on the present invention except as set forth in the appended claims. All parts and percentages are by weight unless otherwise specified.

Any appropriate flame-retardance test may be used to determine the flame-retarding properties of any specific compound. One test which is reasonably efficient is ASTM test D-635-63. The specifications for this test are: a specimen, 5″ in length, 0.5″ in width and 0.125″ in thickness, is marked at the 1″ and 4″ lengths and is then supported with its longitudinal axis horizontal and its transverse axis inclined at 45° to the horizontal. A Bunsen burner with a 1″ blue flame is placed under the free end of the strip and is adjusted so that the flame tip is just in contact with the strip. At the end of 30 seconds, the flame is removed and the specimen is allowed to burn. If the specimen does not continue to burn after the first ignition it is immediately recontacted with the burner for another 30 second period. If, after the two burnings, the strip is not burned to the 4″ mark, the specimen is designated as "self-extinguishing" or "flame-retardant."

An alternate test is to form a film of about 0.125″ in thickness and place a burning match in contact therewith. If the film continues to burn after the match is removed, the film is not flame-proof.

Example 1

To 30 parts of methyl methacrylate are added 5 parts of $SnCl_4$ and 5 parts of $SnI_4$. The mixture is stirred until the halides dissolve and then 60 parts of a 70% solids solution of poly(methyl methacrylate) in methyl methacrylate are added. The resultant mixture is stirred until homogeneous and 0.8 part of benzoyl peroxide is then

TABLE I

| Example | Polymer | Halide mixture, percent | Results of ASTM-D-635-63 Test |
|---|---|---|---|
| 1 | Poly(methyl methacrylate) | $SnCl_4$, 5 plus $SnI_4$, 5 | Self-extinguishing. |
| 2 | do | $SnCl_4$, 10 | Burns. |
| 3 | do | $SnI_4$, 10 | Do. |
| 4 | Poly(ethyl methacrylate) | $SnCl_4$, 5 plus $SnBr_4$, 5 | Self-extinguishing. |
| 5 | do | $SnCl_4$, 10 | Burns. |
| 6 | do | $SnBr_4$, 10 | Do. |
| 7 | do | $SnBr_4$, 4 plus $SnCl_4$, 4 | Self-extinguishing. |
| 8 | do | $SnI_4$, 8 | Burns. |
| 9 | Poly(methyl methacrylate) | $SnBr_4$, 4 plus $SnCl_4$, 4 | Self-extinguishing. |
| 10 | do | $SnBr_4$, 8 | Burns. |
| 11 | Methyl methacrylate/acrylonitrile/acrylamide, 32.8/64.4/2.8 | $SnCl_4$, 7 plus $SnI_4$, 3 | Self-extinguishing. |
| 12 | do | $SnCl_4$, 10 | Burns. |
| 13 | do | $SnI_4$, 10 | Do. |
| 14 | Methyl methacrylate/ethyl acrylate, 90/10 | $SnCl_4$, 6 plus $SnBr_4$, 6 | Self-extinguishing. |
| 15 | do | $SnBr_4$, 12 | Burns. |
| 16 | do | $SnCl_4$, 10 | Do. |
| 17 | Methyl methacrylate/styrene, 95/5 | $SnBr_4$, 4 plus $SnI_4$, 6 | Self-extinguishing. |
| 18 | Poly(ethyl acrylate) | $SnCl_4$, 10 plus $SnBr_4$, 10 | Do. |
| 19 | Methyl methacrylate/acrylonitrile, 60/40 | $SnCl_4$, 7 plus $SnI_4$, 5 | Do. |
| 20 | Methyl methacrylate/vinyl acetate, 92/8 | $SnCl_4$, 7 plus $SnI_4$, 5 | Do. |
| 21 | Poly(n-hexyl acrylate) | $SnCl_4$, 6 plus $SnBr_4$, 6 | Do. |
| 22 | Poly(acrylic acid) | $SnBr_4$, 7.5 plus $SnI_4$, 7.5 | Do. |
| 23 | Poly(methyl methacrylate) | $SnCl_4$, 3 plus $SnBr_4$, 2 plus $SnI_4$, 3 | Do. | added. The system is stirred until the peroxide is dissolved and the resultant solution is charged into a polymerization cell. The cell is heated at 55° C. for 16 hours, 70° C. for 1 hour and 100° C. for 1 hour. A cast sheet is then recovered and subjected to the ASTM-D-635-63 flame test specified above. The sheet is self-extinguishing.

Following the procedure of Example 1 various other acrylate and methacrylate polymers were formed containing various additives. The results are set forth in preceding Table I.

In each of Examples 17-23 the halides, when added to the same polymer individually at the combined concentration, did not produce a self-extinguishing polymer.

We claim:
1. A flame-retarded composition comprising a polymer of a monomer having the formula

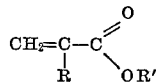

wherein R is selected from the group consisting of hydrogen and a methyl radical and R' is selected from the group consisting of hydrogen and an alkyl radical having from 1-6 carbon atoms, inclusive, and a flame-retarding amount of a mixture of at least two compounds having the formula $SnX_4$, wherein X is selected from the group consisting of chlorine, bromine and iodine, in an amount of from 8% to 20% based on the weight of the polymer, the sum of the amounts of said compounds being less than that amount at which any of said compounds used functions individually in a flame-retarding manner similar to said mixture in the same polymer to which the mixture is added.

2. A composition according to claim 1 wherein said polymer contains up to 70%, by weight, based on the total weight of the polymer, of at least one ethylenically unsaturated monomer copolymerizable therewith.

3. A composition according to claim 1 wherein said polymer is poly(methyl methacrylate).

4. A composition according to claim 1 wherein said polymer is a coplymer of methyl methacrylate and acrylonitrile.

5. A composition according to claim 1 wherein said polymer is a copolymer of methyl methacrylate, acrylonitrile and acrylamide.

6. A composition according to claim 1 wherein said additive is a mixture of stannic iodide and stannic chloride.

7. A composition according to claim 1 wherein said additive is a mixture of stannic iodide and stannic bromide.

8. A composition according to claim 1 wherein said additive is a mixture of stannic chloride and stannic bromide.

References Cited

UNITED STATES PATENTS 3,239,482   3/1966   Rapp _____ 260—41

DONALD E. CZAJA, Primary Examiner

J. P. HOKE, Assistant Examiner

U.S. Cl. X.R.

252—8.1